United States Patent [19]

Hill

[11] Patent Number: 5,273,564
[45] Date of Patent: Dec. 28, 1993

[54] ONE PIECE FILTER MEDIA FRAMEWORK

[75] Inventor: Charles W. Hill, Madison, Wis.

[73] Assignee: Research Products Corporation, Madison, Wis.

[21] Appl. No.: 996,798

[22] Filed: Dec. 24, 1992

[51] Int. Cl.⁵ .............................................. B01D 46/52
[52] U.S. Cl. ...................................... 55/493; 55/497; 55/521
[58] Field of Search ................ 55/493, 495, 497, 503, 55/521

[56] References Cited

U.S. PATENT DOCUMENTS

| | | | |
|---|---|---|---|
| 3,660,969 | 5/1972 | Fox | 55/493 X |
| 3,712,033 | 1/1973 | Gronholz | 55/493 |
| 3,778,985 | 12/1973 | Daigle et al. | 55/493 |
| 3,869,392 | 3/1975 | Wolf | 55/521 X |
| 4,217,122 | 8/1980 | Shuler | 55/493 X |
| 4,547,950 | 10/1985 | Thompson | 55/521 X |

*Primary Examiner*—Charles Hart
*Attorney, Agent, or Firm*—Andrus, Sceales, Starke & Sawall

[57] ABSTRACT

A one piece framework for holding the filter media of an air filter includes a pair of end walls integrally connected to a pair of frame members by a living hinge so that they may be pivotally moved between an assembled and unassembled position. A pair of side walls are integrally connected to the frame members by a living hinge only at their outermost ends so that they, too, may be pivotally moved between their assembled and unassembled position. The side walls and end walls are provided with a projection and a projection receiving latch that locks the end walls and side walls in their assembled state.

9 Claims, 5 Drawing Sheets

ONE PIECE FILTER MEDIA FRAMEWORK

BACKGROUND OF THE INVENTION

The present invention relates to air filters and, more particularly, to a one piece framework for holding the filter media of an air filter.

In the past, the framework for holding the filter media of an air filter was constructed of a number of pieces which were assembled to form a framework for holding the filter media. Some one piece frameworks were stamped from metal, but these frames were difficult to assemble into a final framework.

Other one piece plastic frameworks utilized a frame member that extended around the entire framework and a cross-brace that connected and spanned the frame member.

It is an object of the present invention to provide a one piece plastic framework for holding the filter media of an air filter that has a pair of frame members and eliminates the need for a cross-brace.

It is also an object of the present invention to provide a one piece filter framework that has simple closures for holding the side walls and the end walls of the framework in an assembled state.

It is also an object of the present invention to provide a flange on the end walls of the framework to support and position the filter media.

It is a further object of the present invention to provide locators on the inner surface of the end walls that define a groove and an abutment that engages the edge of the side walls so that the assembly of the framework is facilitated.

SUMMARY OF THE INVENTION

A one piece framework for holding the filter media of an air filter includes a pair of end walls, one of which is integrally connected to a first frame member by a living hinge and the other being integrally connected to a second frame member by a living hinge so that the two end walls may be pivotally moved between an assembled and unassembled position.

In accordance with yet another aspect of the invention, the framework is provided with a pair of side walls that are integrally connected to both the first and second frame members by a living hinge at their outermost ends so that they, too, may be pivotally moved between an assembled and unassembled position.

In accordance with yet another aspect of the invention, one of either the side walls or the end walls is provided with a projection on its surface which mates with an opening on a pivoting latch disposed on the other side wall or end wall.

In accordance with still another aspect of the invention, the surface having the projection is provided with a depression adjacent that projection to facilitate access to the latch.

In accordance with still another aspect of the invention, the inner surface of the end wall is provided with a locator that facilitates the positioning of the walls when they are moved to their assembled position and also facilitates the alignment of the latch with the projection.

The present invention thus provides a one piece framework for holding the filter media of a filter which may be easily moved and locked into its assembled position.

BRIEF DESCRIPTION OF THE DRAWINGS

The drawings illustrate the best mode presently contemplated of carrying out the invention.

In the drawings.

DETAILED DESCRIPTION OF THE PREFERRED EMBODIMENT

Figure 1:
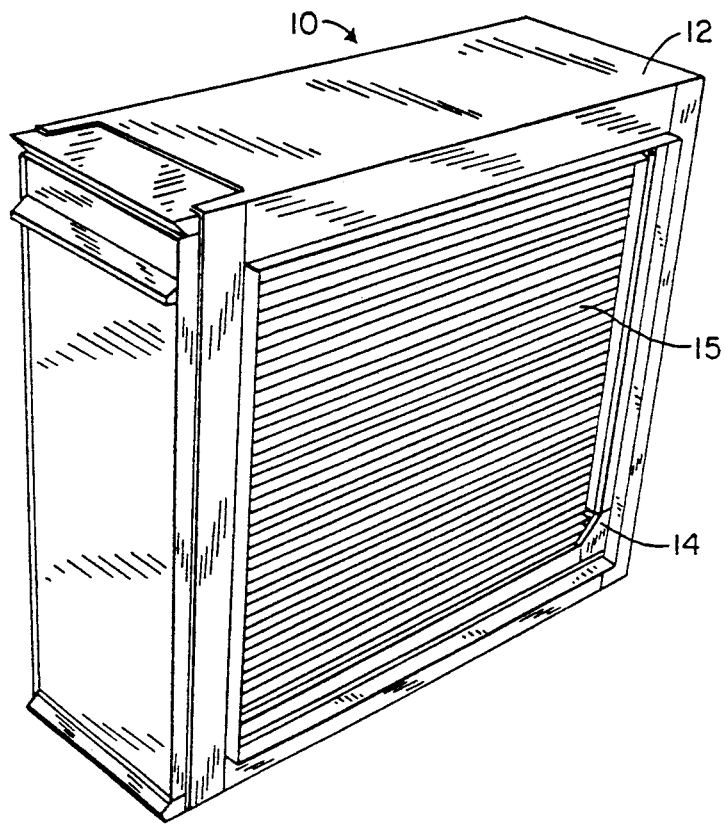
FIG. 1 is a perspective view of an air filter constructed according to the present invention.

As shown in FIG. 1, an air filter 10 includes a housing 12 in which a filter framework 14 is slidably disposed. Filter framework 14 holds replaceable pleated filter media 15. In operation, housing 12 of air filter 10 is positioned in the ventilation system of a home or other structure and air is drawn across filter media 15 so as to remove undesirable particulate matter from the air. Periodic maintenance of air filter 10 requires replacement of filter media 15 and this is performed by sliding filter framework 14 out from housing 12 (FIG. 2).

Figure 3:
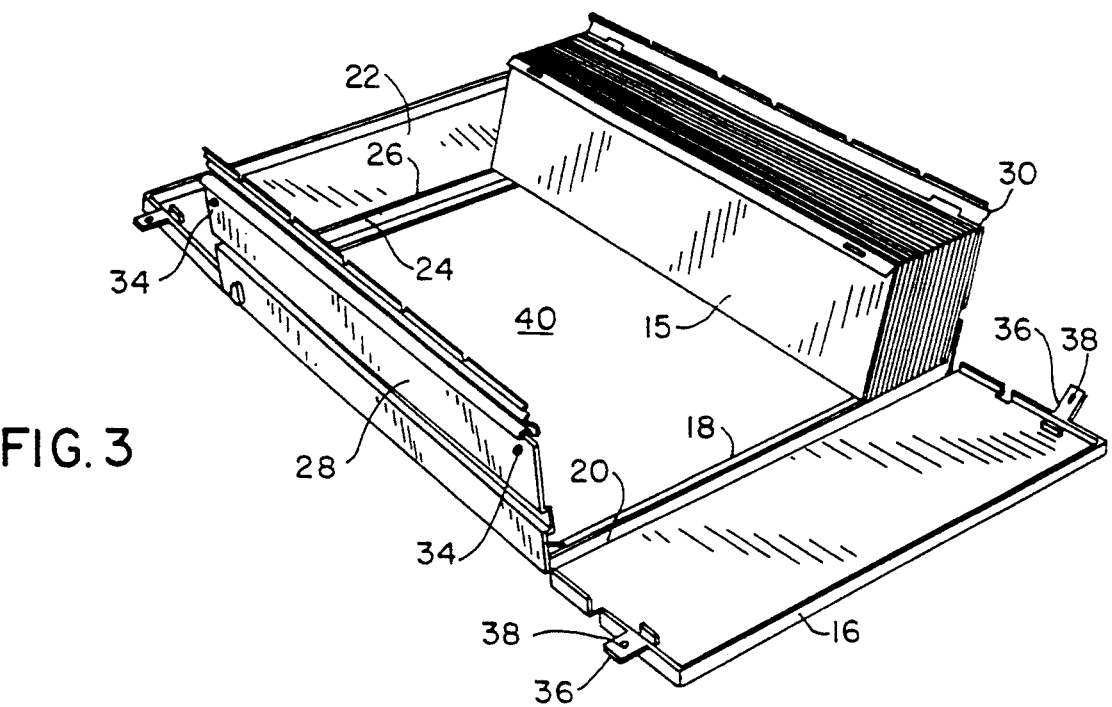
FIG. 3 is a perspective view of the filter media framework in an unassembled state with the side walls raised.
Figure 4:
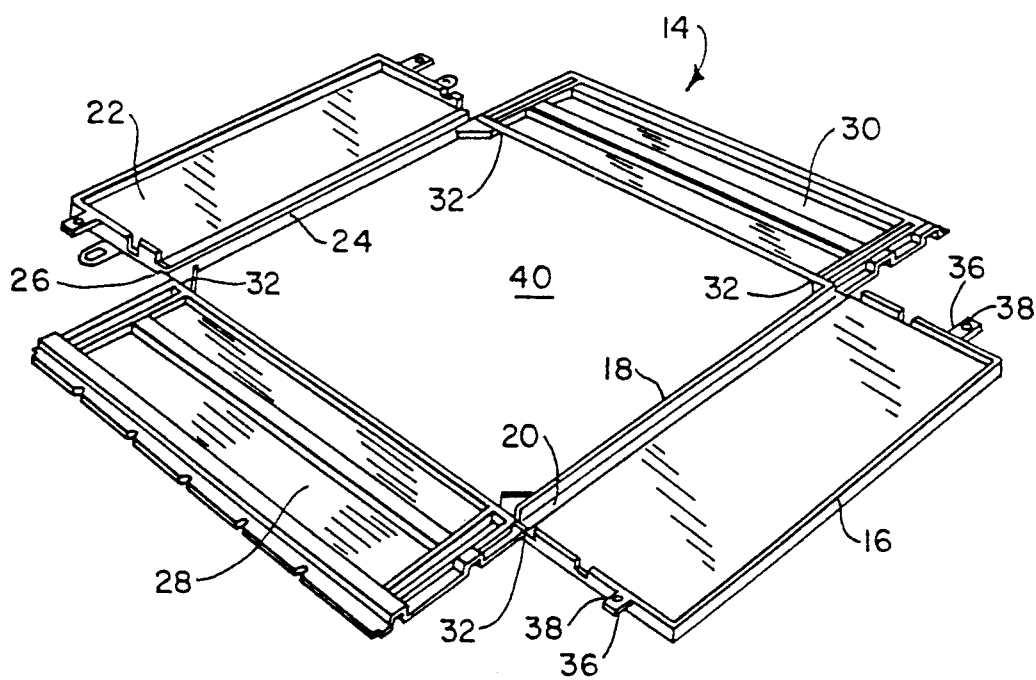
FIG. 4 is a side perspective view of the filter media framework in an unassembled flat state.
Figure 5:
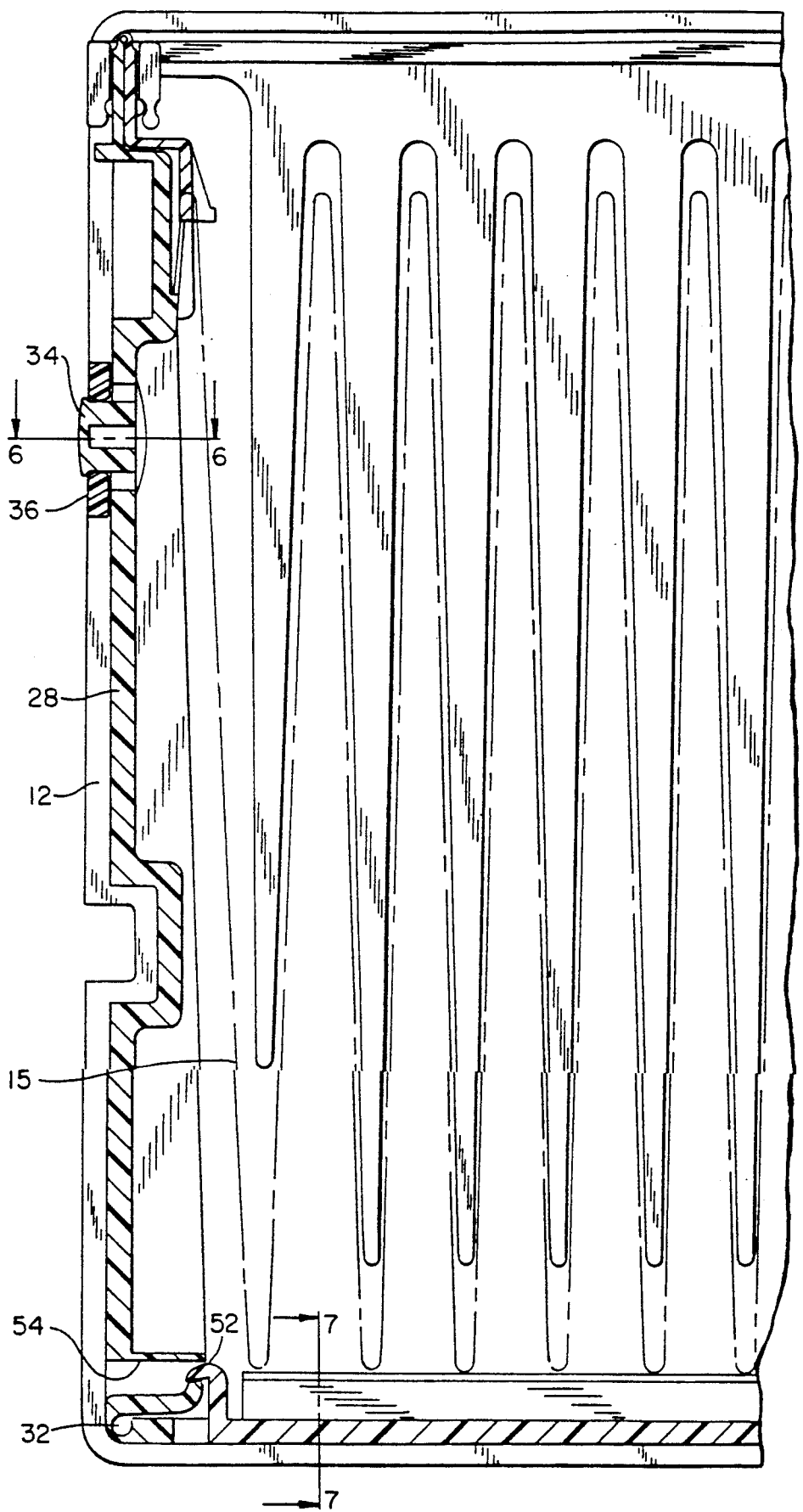
FIG. 5 is a side cross-sectional view of the filter media framework in an assembled state.
Figure 6:
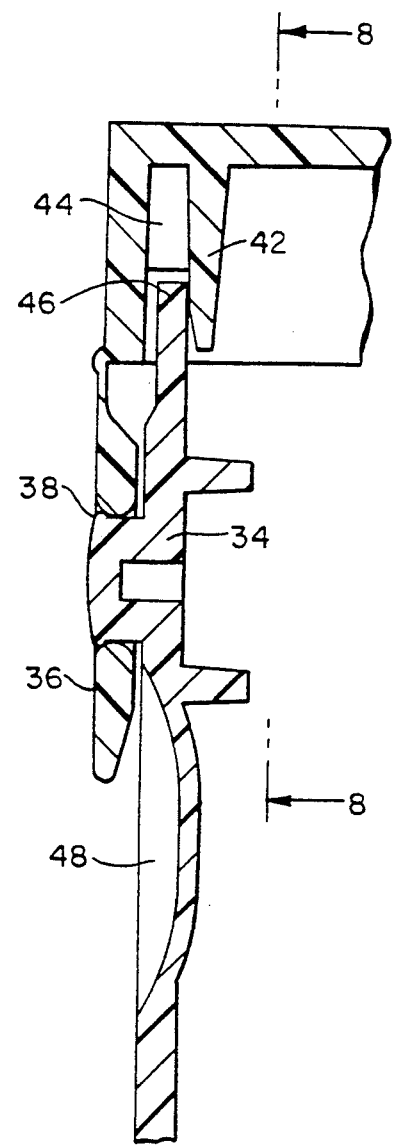
FIG. 6 is a sectional view along the line 6—6 of FIG. 5.

Framework 14 is formed from a flat single sheet of plastic and includes a first end wall 16 integrally connected to first frame member 18 by means of a living hinge 20 that allows end wall 16 to be pivotally moved between its unassembled state (FIGS. 3 and 4) and its assembled state (FIGS. 5 and 6). Similarly, framework 14 is provided with a second end wall 22 that is integrally connected to a second frame member 24 by a living hinge 26 which permits second end wall 22 to be pivotally moved between unassembled and assembled positions.

Framework 14 is also provided with a first side wall 28 and a second side wall 30, both of which are integrally connected to frame members 18 and 24 by means of a living hinge 32 at their outermost ends that permits side walls 28 and 30 to be pivotally moved between unassembled and assembled positions. Each of side walls 28 and 30 is provided with a pair of projections 34 located on the outer surface of the side wall and near the edge of the side wall. Each of end walls 16 and 22 is provided with a pair of tab-like pivoting latches 36 each of which pivots independently in hinged fashion with respect to end walls 16 and 22 and has an opening 38 that frictionally engages pin 34 and holds its respective end wall to the adjacent side wall in an assembled state.

Figure 2:
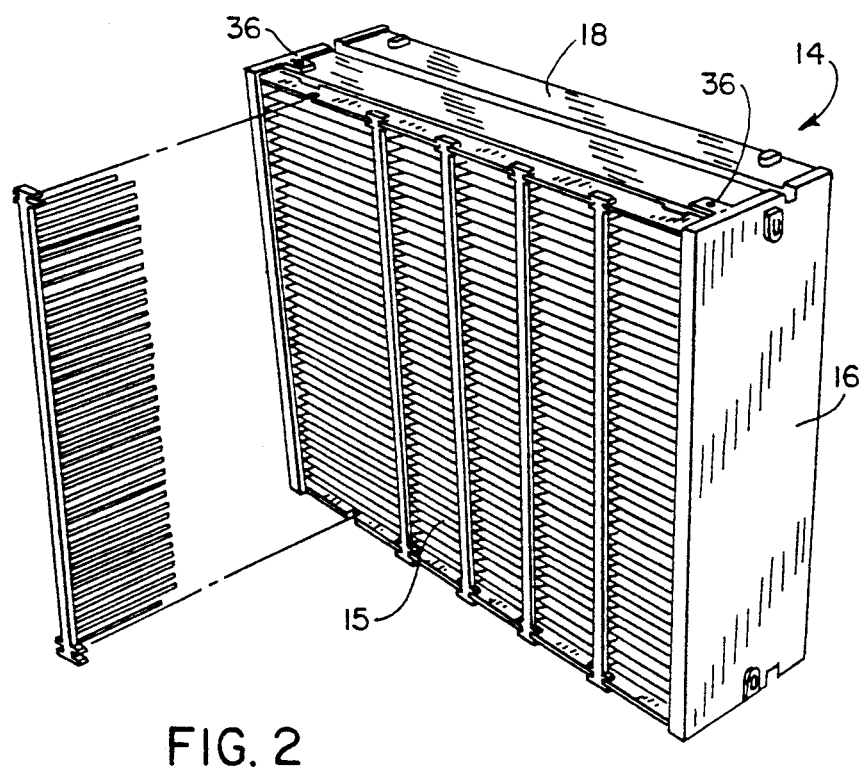
FIG. 2 is a perspective view of the filter media holding framework removed from the filter of FIG. 1.

As shown in FIG. 2, when end walls 16 and 22 and side walls 28 and 30 are in their assembled position, a rectangular opening 40 is defined across which filter media 15 spans.

Each of end walls 16 and 22 is provided with locator means 42 on its inner surface approximate its outer edge. Locator means 42 is in the form of a ramped wedge that defines a groove 44 that accepts an edge 46 of the side wall. Ramped edge 45 of locator 42 engages surface 47 on the side wall and lifts the side wall so that lip 49 on the side wall engages flange 51 on the end wall. Thus, locator 42 positions the side walls and end walls in their assembled position and facilitates the alignment of latch 36 with projection 34.

As seen in FIG. 5, frame members 18 and 24 are provided with a detent in the form of projection 52 that is engageable with slot 54 in side wall 28. This detent holds side wall 28 in its assembled position while latches 36 are engaged with projections 34.

Figure 9:
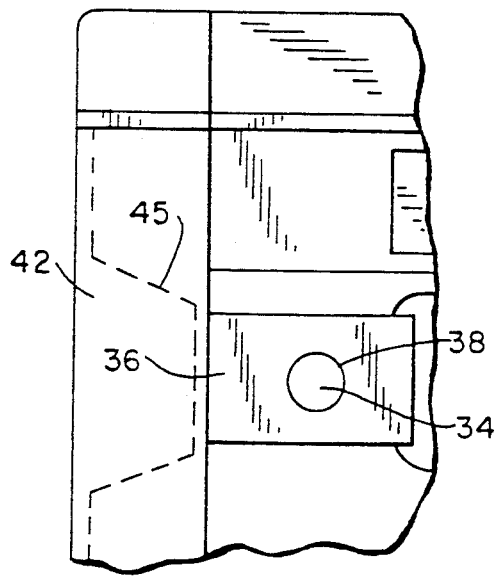
FIG. 9 is a plan view of the latch mechanism.
Figure 8:
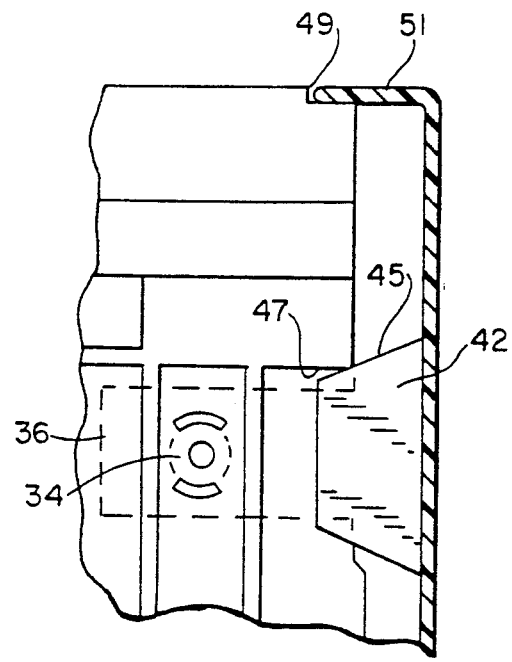
FIG. 8 is a sectional view along the line 8—8 of FIG. 6.

As seen in FIGS. 6 and 9, the side walls are provided with a depression 48 disposed adjacent projection 34. Depression 48 facilitates access to the edge of latch 36 in that it allows the finger of a user to be wedged beneath the edge of latch 36 so as to pry latch 36 open.

Figure 7:
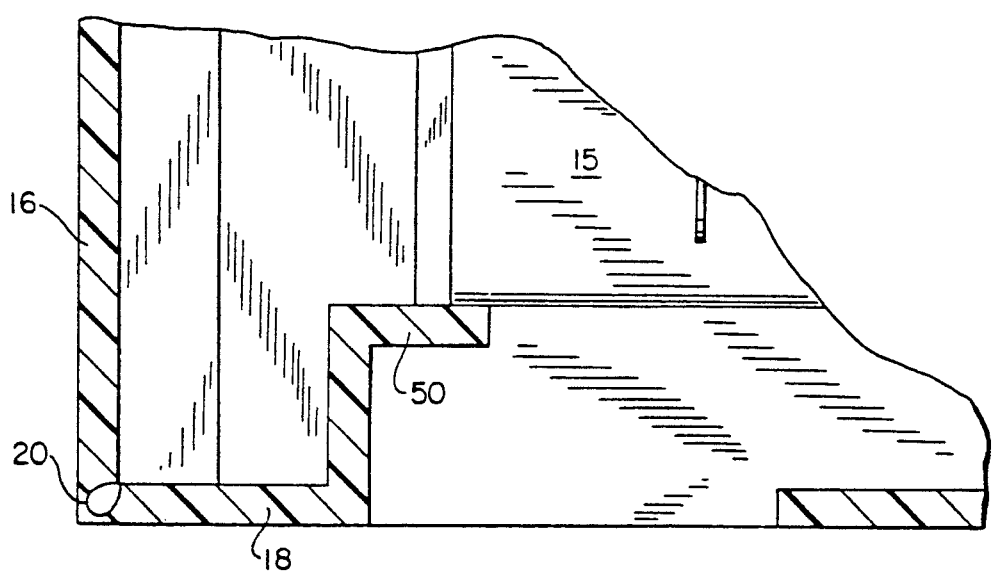
FIG. 7 is a sectional view along the line 7—7 of FIG. 5.

As seen in FIG. 7, each of end walls 16 and 18 is provided with an inwardly projecting L-shaped flange 50 that supports the edge of filter media 15 so as to support and position filter media 15.

Various modes of carrying out the invention are contemplated as being within the scope of the following claims particularly pointing out and distinctly claiming the subject matter regarded as the invention.

I claim:

1. A one piece framework for holding the filter media of an air filter, said framework comprising:
  a first end wall integrally connected to a first frame member by a living hinge so that said first end wall may be pivotally moved between an assembled and unassembled position,
  a second end wall integrally connected to a second frame member by a living hinge so that said second end wall may be pivotally moved between an assembled and unassembled position,
  a first side wall integrally connected at its outermost ends to said first and second frame members by a living hinge so that said first side wall may be pivotally moved between an assembled and unassembled position,
  a second side wall integrally connected at its outermost ends to said first and second frame members by a living hinge so that said second side wall may be pivotally moved between an assembled and unassembled position,
  said side walls and end walls defining a substantially rectangular opening when in said assembled position, and
  each of either of said side walls or end walls provided with a projection on its outer surface and each of the other of said side walls or end walls provided with a tab-like latch pivoting independently in hinged fashion with respect thereto and having an opening that frictionally surrounds said projection in a snap-fit and holds said side wall to said end wall in an assembled state.

2. The one piece framework defined in claim 1 wherein the filter media is connected to said side walls and spans said rectangular opening and said frame members include a flange portion extending inwardly into said opening and into engagement with the bottom of the filter media to provide a support between the framework and the filter media.

3. The one piece framework defined in claim 1 further comprising a depression adjacent said projection to facilitate access to said latch.

4. The one piece framework defined in claim 1 further comprising locator means disposed on said end wall and defining a ramped surface that engages a surface on said side wall when said walls are moved to said assembled position to facilitate the alignment of said latch with said projection.

5. The one piece framework defined in claim 4 wherein said locator means comprises a ramped wedge disposed on the inner surface of said end wall.

6. The one piece framework defined in claim 1 further comprising detent means on said frame members to hold said side walls in said assembled position.

7. The one piece framework defined in claim 6 wherein said detent means comprises a projection on said frame member engageable with a slot in said side wall.

8. A one piece framework for holding the filter media of an air filter, said framework comprising:
  a first end wall integrally connected to a first frame member by a living hinge so that said first end wall may be pivotally moved between an assembled and unassembled position,
  a second end wall integrally connected to a second frame member by a living hinge so that said second end wall may be pivotally moved between an assembled and unassembled position,
  a first side wall integrally connected at its outermost ends to said first and second frame members by a living hinge so that said first side wall may be pivotally moved between an assembled and unassembled position,
  a second side wall integrally connected at its outermost ends to said first and second frame members by a living hinge so that said second side wall may be pivotally moved between an assembled and unassembled position,
  said side walls and end walls defining a substantially rectangular opening when in said assembled position, and
  each of either of said side walls or end walls provided with a projection on its outer surface and each of the other of said side walls or end walls provided with a tab-like latch pivoting independently in hinged fashion with respect thereto and having an opening that frictionally surrounds said projection in a snap-fit and holds said side wall to said end wall in an assembled state; and
  locator means disposed on said end wall and defining a ramped surface along which a surface on said side wall is guided to lift said side wall when said walls are moved to said assembled position to facilitate the alignment of said latch with said projection.

9. A one piece framework for holding the filter media of an air filter, said framework comprising:
  a first end wall integrally connected to a first frame member by a living hinge so that said first end wall may be pivotally moved between an assembled and unassembled position,
  a second end wall integrally connected to a second frame member by a living hinge so that said second end wall may be pivotally moved between an assembled and unassembled position,
  a first side wall integrally connected to its outermost ends to said first and second frame members by a living hinge so that said first side wall may be pivotally moved between an assembled and unassembled position,
  a second side wall integrally connected at its outermost ends to said first and second frame members by a living hinge so that said second side wall may be pivotally moved between an assembled and unassembled position, said side walls and ends walls defining a substantially rectangular opening when in said assembled position, and wherein the filter media is connected to said side walls and spans said rectangular opening and said frame members include an L-shaped flange portion offset from each of said end walls, extending inwardly into said opening and into engagement with the bottom edge of the entire filter media to provide a raised support between the framework and the filter media.

* * * * *